US007853885B2

(12) United States Patent
Ramcharran et al.

(10) Patent No.: US 7,853,885 B2
(45) Date of Patent: Dec. 14, 2010

(54) SYSTEM AND METHOD FOR AUTOMATED PROCESSING OF REQUESTS FOR APPROVAL OF MATERIALS FOR BUSINESS DEVELOPMENT

(75) Inventors: Leon Ramcharran, Queens Village, NY (US); Richard Biegen, New York, NY (US); Erik Mogavero, Westbury, NY (US); Cheryll Moore, Mount Vernon, NY (US); Steve Weinreb, Plainsboro, NJ (US); Sal Nargi, Eastchester, NY (US)

(73) Assignee: American International Group, Inc., New York, NY (US)

( * ) Notice: Subject to any disclaimer, the term of this patent is extended or adjusted under 35 U.S.C. 154(b) by 938 days.

(21) Appl. No.: 11/357,510

(22) Filed: Feb. 17, 2006

(65) Prior Publication Data

US 2007/0150296 A1 Jun. 28, 2007

Related U.S. Application Data

(60) Provisional application No. 60/753,859, filed on Dec. 23, 2005.

(51) Int. Cl.
G06F 3/00 (2006.01)
(52) U.S. Cl. .................. 715/751; 715/752; 715/222; 715/221; 715/224
(58) Field of Classification Search .......... 715/751, 715/752, 971, 221, 222, 224
See application file for complete search history.

(56) References Cited

U.S. PATENT DOCUMENTS

| 2001/0032092 | A1  | 10/2001 | Calver |
| 2002/0065671 | A1  | 5/2002  | Goerz, Jr. et al. |
| 2002/0069214 | A1  | 6/2002  | Smith et al. |
| 2002/0087446 | A1  | 7/2002  | Reddy |
| 2003/0125962 | A1  | 7/2003  | Holliday et al. |
| 2003/0153547 | A1  | 8/2003  | Aida et al. |
| 2003/0182212 | A1* | 9/2003  | Moscone et al. ............... 705/30 |
| 2003/0189592 | A1* | 10/2003 | Boresjo ....................... 345/751 |
| 2004/0172308 | A1  | 9/2004  | Macchia |
| 2004/0193515 | A1  | 9/2004  | Peterson et al. |
| 2006/0184865 | A1* | 8/2006  | Chakraborty ................ 715/500 |
| 2006/0190475 | A1* | 8/2006  | Shi ............................ 707/102 |

\* cited by examiner

*Primary Examiner*—Dennis Bonshock
(74) *Attorney, Agent, or Firm*—Leydig, Voit & Mayer, Ltd.

(57) ABSTRACT

A system and method for automated processing requests for reviewing and approving business development materials, such as marketing flipbooks and request for proposals, etc., for compliance and performance approval employs an application server that presents a web-based request form. A requestor uses the request form to enter information regarding the approval request and to select reviewer. The application server then generates a request document and sends it with the business development materials to the selected reviewer(s). The request form and marketing presentation materials are archived in a database to allow real-time monitoring and future auditing.

16 Claims, 11 Drawing Sheets

CARF Main Page

FIG. 2

CARF Form – Page 1

AIG Global Investment Group®

Compliance Approval Request Form (CARF) | CARF II ASIA CARE

A) Project Description

Submitted By: Standard Marketing Material
Telephone: Angela Coppola
 415-399-5847
Date & Time Submitted: 10/13/2005 16:39
Date & Time Required: 11/14/2005 16:40
Client or Prospect Name: San Francisco City and County Employees Retirement Fund
Existing Client? ☑ Yes ☐ No
Country of Client/Prospect: SF, USA
Country where material will be presented: SF, USA
Consultant(s) name (if applicable):
Date of use: 11/15/2005
Presented By (name of sales rep., client service, portfolio manager(s) etc.): Mike Obley
Name of Product/Strategy presented: AOF II

B) Audience (check one box)
☑ Institutional
☐ Retail

C) Distribution (check at least one box)
☑ External-Public Distribution ☐ Internal Use Only
☐ External One-on-One ☐ For Broker/Dealer Use Only
☐ External Consultant ☐ Internet
 ☐ Other Specify

D) Type of Material (check at least one box)
☑ Flipbook ☐ Web Content

AIG Global Investment Group®

CARF Form – Page 2

- ☑ Flipbook
- ☐ RFP/RFI
- ☐ Sample RFP
- ☐ Fact Sheet
- ☐ Advertisement

- ☐ Web Content
- ☐ Newsletter
- ☐ Press Release
- ☐ Other Specify

AIG Global Investment Group

Marketing Approval

Is there performance information in the marketing piece?  ☐ Yes ☑ No

What is the source of this information?

Are the source and date named for statistics and performance figures?  ☐ Yes ☐ No
Is the new brand identity definition included?  ☐ Yes ☐ No
Subject to compliance sign-off, have all relevant footnotes and Appendix references been correctly included?  ☐ Yes ☐ No
Do you believe the content to be true, fair and not misleading?  ☐ Yes ☐ No
Is there documentation available to evidence facts and figures used?  ☐ Yes ☐ No Business/Requestor Signoff (Name/Date/Time)

Additional comments by requestor:

Please select the Compliance person(s) to review this material. — 60

Performance:
- NONE
- Clinton, Jon
- Connell, George
- Dewar, Julie
- Bunglavan, Scott
- Feigen, John
- Liu, Jerome
- Lockhard, Scott Compliance:
- NONE
- Bakoff, Dominique
- Berger, Robin
- Blegen, Robin
- Clay, Iris
- Gaffney, Keith
- Oulette, Paul
- Haywood, Jeffrey

— 62

Notice To: ☐ — 64

Attach Files — 63

Select File:  [ Browse... ] — 65
Select File:  [ Browse... ]
Select File:  [ Browse... ]

The total file[s] size cannot exceed 3.0MB's. — 56

[ Submit ] — 66

FIG. 6

Email to Compliance officer

CARF - By:Angela Coppola - (AOF II) - "For your review and approval" Message (HTML)

File  Edit  View  Insert  Format  Tools  Actions  Help

Reply | Reply to All | Forward |

From: CARF@aig.com
To: Paul.Gulletta@aig.com; YerraV.Parthasarathy@aig.com
Cc:
Subject: CARF - By:Angela Coppola - (AOF II) - For your review and approval.

Attachments: 1001267STD_10-13-2005-15-55-28.doc (89 KB) —32

Sent: Thu 10/13/2005 3:56 PM

You have been selected by ANGELA COPPOLA to review and approve the following.

—71

Standard Marketing Material

Project Description
Additional comments by requestor:
Submitted By:                          Angela Coppola
Telephone:                             415-399-5847
Date & Time Submitted:                 Thu, 13 Oct 2005 19:50:00 GMT
Date & Time Required:                  Thu, 13 Oct 2005 19:46:00 GMT
48 Hours in Advance?                   NO
Client or Prospect Name:               San Francisco City and County Employees Retirement
                                       Fund
Existing Client?                       YES
Country of Client/Prospect             SF
Country where material will be presented: SF
Consultant(s) name (if applicable):
Date of use:                           10/13/2005
Presented By (name of sales rep., client service, portfolio manager(s) etc.): Mike Obley
Name of Product/Strategy presented:    AOF II

CARF - Standard Marketing Material

FIG. 10

SYSTEM AND METHOD FOR AUTOMATED PROCESSING OF REQUESTS FOR APPROVAL OF MATERIALS FOR BUSINESS DEVELOPMENT

RELATED APPLICATION

The invention claims the priority of U.S. Provisional Application 60/753,859, filed Dec. 23, 2005.

FIELD OF THE INVENTION

The invention generally relates to business development materials such as marketing presentations and requests for proposals (RFPs), and more particularly to a process of reviewing business development materials for compliance and performance approval.

BACKGROUND OF THE INVENTION

Service providers in various industries, such as financial and insurance industries, routinely prepare materials for business development, such as marketing presentations and requests for proposals (RFPs), etc., for purposes of generating new business or updating existing clients. The materials for business development often contain performance data and advertising representations that must comply with regulatory and best practices marketing standards. To ensure the quality of the marketing presentations, RFPs, and other business development materials, many service providers have implemented internal compliance and performance reviews for the business development materials before they can be actually used, in order to prevent the inclusion of wrong, inaccurate, or improper information in the materials. Moreover, there are U.S. Federal regulations, industry best practices, foreign, industry related, and internal policies regarding the presentations and data usage that have to be followed, and the compliance with the rules also has to be checked before the business development materials can be used.

In the conventional business setting, however, the process of reviewing business development materials for performance and compliance can be quite cumbersome and difficult to coordinate and monitor, and the turn-around time can be quite long. Typically, a requestor for compliance and/or performance review would send in the request and the business development materials by mail or other means to the reviewers, and it is often confusing for the requestor to find the right regional reviewer(s) or specialist(s) for the particular product being marketed. When a reviewer receives the request, it is quite often hard for the reviewer to identify the extent of review required, which depends on the product specific information, the applicable laws of the jurisdiction where the audience resides and where the presentations will be made, and the type of prospect or client.

SUMMARY OF THE INVENTION

In view of the foregoing, it is an object of the invention to provide a system and method for processing requests for performance and compliance review/approval of business development materials, such as marketing presentations and request for proposals (RFPs), etc., that significantly simplifies the generation and distribution of the review request.

It is a related object of the invention to provide the ability for real-time tracking of review requests for business development materials, business approvals, performance approvals and compliance audited information during the review process, and archiving the review results.

These objects and other related projects are achieved by the present invention, which provides an automated system and method for processing requests for reviews of business development materials for compliance and performance. The automated process is based on a computer-assisted generation and submission of a review request, hereinafter referred to as the Compliance Approval Request Form (CARF), through user interface screens provided by an application server that prompt the requestor to enter pertinent information regarding the business development materials, including but not limited to location of presentation and audience domicile, presenter, date of presentation and audience description. Depending on factors such as the type of CARF chosen by the requestor, the geographic location of where the sales and marketing materials will be used, and the source of any performance data being used, the system will determine whether approval is required from performance or compliance reviewers or both. After completing and submitting the CARF form, a request document is automatically created by the application server and attached to an electronic message (e.g., email) with the presentation materials (if provided) included, and sent to the relevant performance and/or compliance reviewers in their respective geographical jurisdiction for review, revision and/or approval. The system also stores the request information and business development materials to enable efficient tracking, archiving, and reporting of the reviews.

The advantages of the invention can be understood from the description of embodiments of the invention set forth below with reference to the drawings, in which:

BRIEF DESCRIPTION OF THE DRAWING(S)

FIG. 2 shows a user interface page presented by an application server for a requestor to initiate a request for approval of business development materials;

FIGS. 4-6 show a user interface page that presents a request form with data fields for the requestor to enter relevant information for the review request;

FIG. 7 shows an email message containing a request document for a review request;

FIG. 10 is a user interface page allowing a user to select a criterion for generating a report.

DETAILED DESCRIPTION OF THE INVENTION

Figure 1:
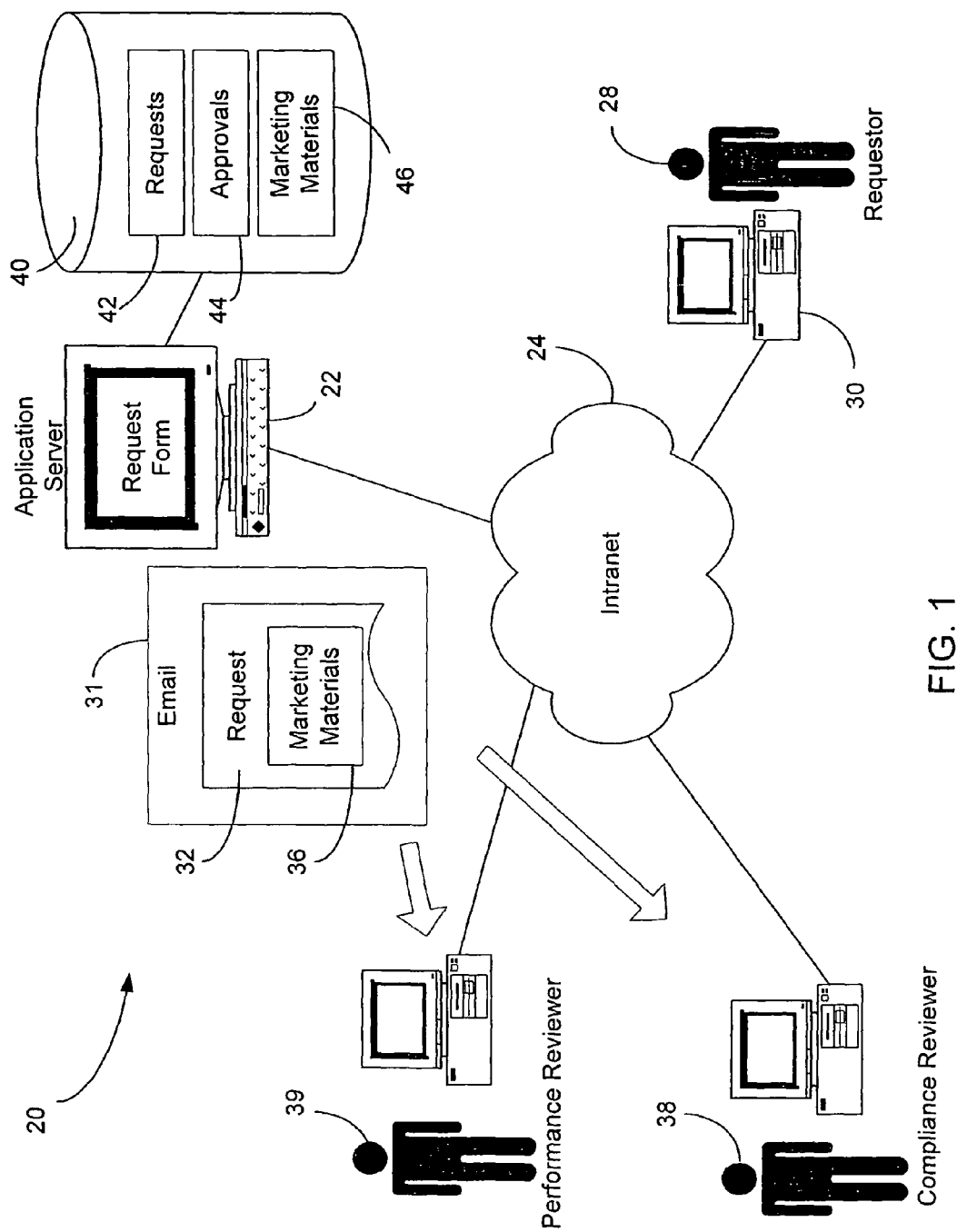
FIG. 1 is a schematic diagram showing an embodiment of a system in accordance with the invention for automated processing of compliance/performance requests.

FIG. 1 shows an embodiment of a system 20 for automated processing of compliance/performance reviews of business development materials in accordance with the invention. The system automatically directs marketing and sales reviews to the selected compliance and/or performance reviewers based on factors such as the product or strategy being sold and the region of the presentation. It also tracks all sales and marketing materials for review and approval from compliance. The request data provided by the requestors and the materials submitted for review are archived such that they can be retrieved in the future for auditing and performance evaluation purposes.

The system of the present invention enables review requests for business development materials to be processed and tracked in a structured, organized, manner. Business development materials encompass various marketing and sales materials used in different stages of business development. By way of example, two common types of business development materials are marketing flipbooks and request for proposals (RFPs). A marketing flipbook is a marketing presentation intended to be given to a potential customer (i.e., a prospect) and may include slide shows, performance analyses, fact sheets, etc. An RFP, typically with questionnaires, is a request from an interested prospect for a more detailed business proposal, which may be handled by a team separate from the marketing representatives that made the initial contact with the prospect. There are many other types of business development materials that may include, for example and not limited to, prospectuses and private placement memoranda; news letters; brochures and circulars; seminar materials; audio or video tapes; mailing inserts; sales materials transmitted electronically through websites pre-approved for compliance; prospect sales materials for external distribution used in conjunction with training programs; sales, marketing or promotional materials or events that are paid by the company, such as radio or television programming; advertising such as newspaper or magazine advertisements and radio and TV commercials; press releases created or distributed by the company or its affiliate to promote business; public relations opportunities such as newspaper or magazine articles; form letters; web contents; and client letters. For illustration purposes, the following description describes an example in which the business development material to be reviewed is a marketing flipbook. It will be appreciated, however, that reviews of other types of business development materials can be similarly carried out in accordance with the invention.

In the embodiment shown in FIG. 1, the system 20 includes an application server 22, which may be for example implemented on a machine that resides on a computer network 24. In a preferred embodiment, the network 24 is the intranet of the company generating the business development materials, and the application server 22 is implemented as a web server. A requestor 28 that wants to make a request for review of his/her business development materials can access the application server 22 via the intranet using a browser on the requestor's computer 30. Alternatively, the network 24 may be a public network such as the Internet. In that case, security measures on different levels, such as password protection, encryption, and point-to-point tunneling, etc., are preferably implemented to prevent eavesdropping, tampering, and theft of information.

In accordance with a feature of the invention, the application server 22 is programmed to interact with the requestor 28 to collect relevant information for generating the review request. The information to be collected includes, for example, the type of review to be performed, the reviewer or reviewers for that request, the location of the business development materials to be reviewed, etc. To that end, as will be described in greater detail below, the application server 22 provides user interface screens for the requestor 28 to enter the needed information. The user interface screens are transmitted over the network 22 for display on the computer 30 of the requestor 28, and data entered by the requestor 28 through the user interface screens are transmitted from the requestor's computer 30 to the application server 22 for processing. The application server 22 then generates a request document 32 based on the information entered by the requestor. The request document 32 is transmitted electronically, such as by email, to one or more designated compliance reviewers 38 and/or performance reviewers 39, together with the business development materials 36 to be reviewed. A selected reviewer reviews the business development materials and gives an approval if the materials are acceptable. The reviewer may also take actions, such as communicating with the requestor, to make changes/corrections to the marketing materials. The request documents 42 and the approvals 44 can be stored in a database 40 for real-time monitoring of the approval process and archived for future auditing and performance evaluation. The database also stores marketing materials 46 that have been approved so that they can be used for references in the future.

Figure 2:
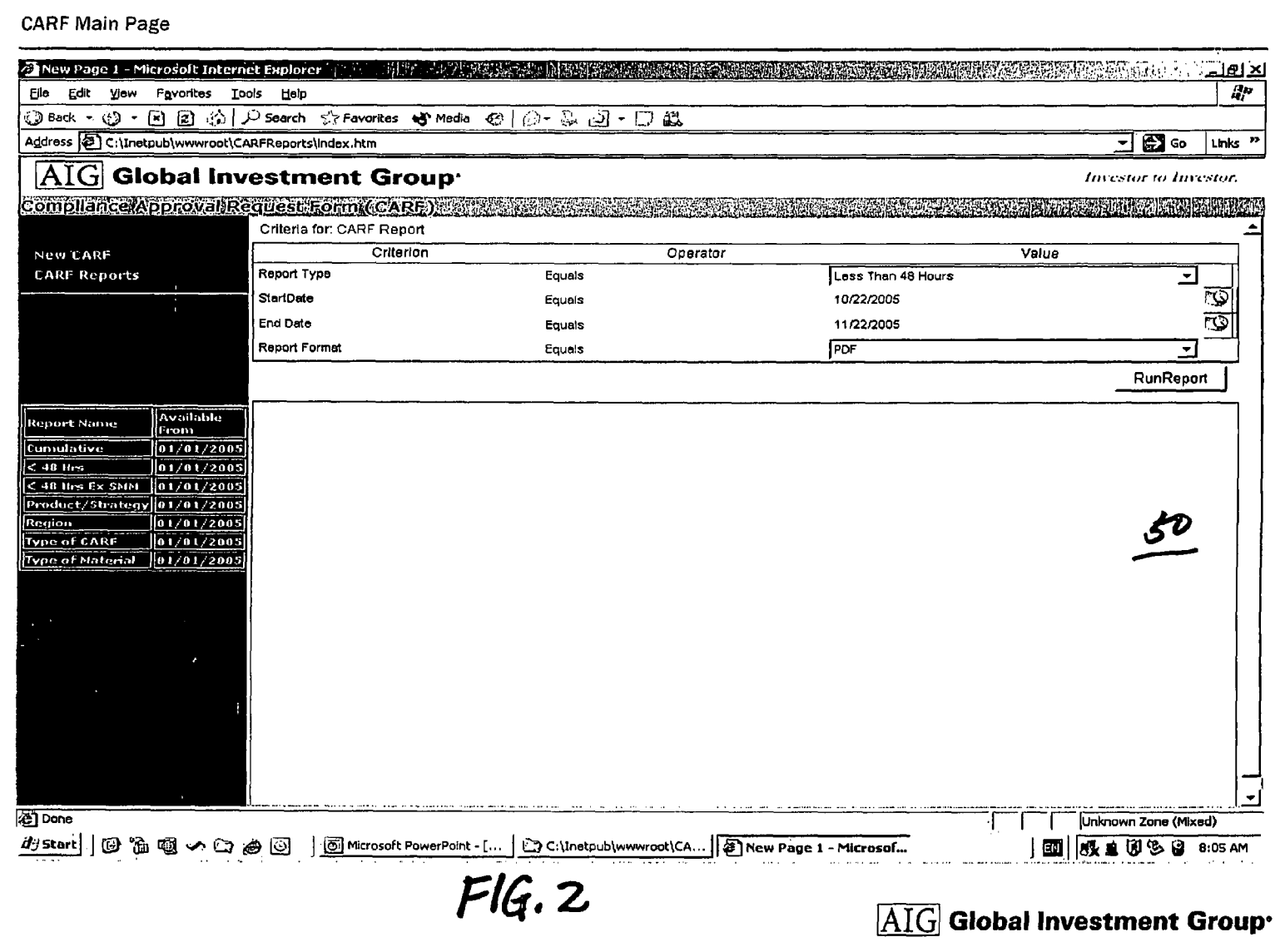
Figure 3:
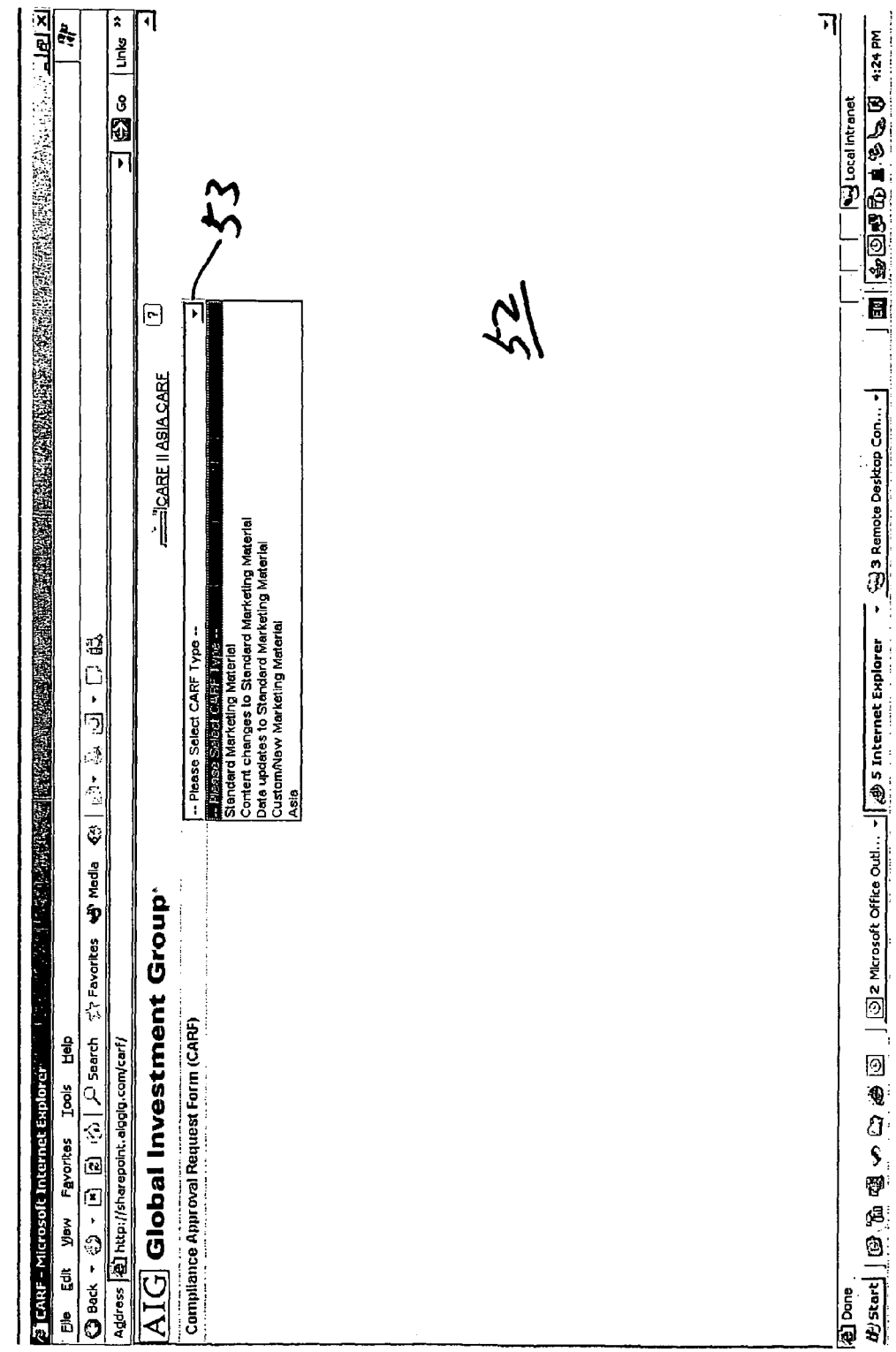
FIG. 3 shows a second user interface page for the requestor to select a review request type.

Turning now to FIG. 2, to submit a compliance/performance review request, the requestor accesses the application server 22 through the intranet 24 and logs in. The application server presents a main start page 50, which allows the request for make a request for a report. To that end, the requestor is prompted to specify the report type, start date, end date, and report format. This start page is also used for the user to initiate the process of generating a review request. If a user clicks on the "New CARF" option in the upper left corner of the screen, the application server presents a request form in the next user interface page 52 as shown in FIG. 3. In that interface page 52, the application server prompts the requestor to select a request type, which may be based on the extent of new materials in the marketing presentation, and other parameters such as the geographic region in which the presentation will be made. In one implementation, the selection box 53 provides a drop-down list that includes five options for the requestor to choose from: Standard marketing material, Content changes to standard marketing material, Data updates to standard marketing material, Custom/new marketing material, and Asia. One of these types may be selected based on the following considerations:

Standard Marketing material—Use if the presentation is a standard presentation that is posted to the intranet and has not been altered in any way except for the date of the presentation and the name of the client on the cover.

Content Changes to Standard Marketing Material—Use if significant changes have been made to the existing standard marketing materials that will become the new standard.

Data Updates to Standard Marketing Material—Use if updating standard marketing materials with charts/graphs from the prior period to the current period from either Performance or another source.

Custom/New Marketing Material—Use if the presentation is completely new or if a standard marketing presentation is being customized for a particular audience, client or prospect.

Asia—Use if this marketing presentation is to be used only in Asia.

Once the user selects the type of CARF request, the application server 22 presents a request form that has multiple data fields for the requestor to enter pertinent data regarding the review request. Depending on the selected request type, the request form may be presented with only pertinent sections enabled, and the requestor has to complete the enabled sections. FIGS. 4-6 show an example of the request form that has various sections. In the first part of the form 56 as shown in FIG. 4, the requestor is prompted to enter data regarding the review in different categories, such as: project description, audience, distribution, type of material, and marketing approval. The meaning (stated in italic) for the data fields in these categories are as follows:

A. Project Description
   Submitted By: name of Requestor submitting the CARF
   Telephone: phone number of the Requestor submitting the CARF
   Date & Time Submitted: Date and Time Requestor submits the CARF. Use calendar to the right to input the date and time in the correct format.
   Date & Time Required: Date and time Requestor would like to receive approval from Performance and/or Compliance.
   Client or Prospect Name: Name of Client or Prospect that will be receiving the material
   Existing Client? Is the audience being presented to an existing client
   Country of Client/Prospect: Country where the client/prospect is domiciled
   Country where material will be presented: Country where the presentation of the material will take place.
   Consultant(s) name (if applicable): name of consultant requesting the information
   Date of use: date that the material will be presented to the client/prospect
   Presented By: name of sales rep., client service, portfolio manager(s) etc.
   Name of Product/Strategy presented: name of the product or strategy B. Audience
   Institutional—check if the material will be presented to an institutional audience
   Retail—check if the material will be presented to a retail audience
   Internal Use Only—check if the material will be used internally only. If the audience is internal, then the material can be submitted for review on a post use basis.
   For Broker/Dealer Use Only—check if the material will be presented only to a broker/dealer affiliated with AIG C. Distribution
   External-Public Distribution—check if the material will be distributed as advertising to the general public
   External One-on-One—check if the material will be distributed to specific client/prospect
   External Consultant—check if the material will be distributed to specific consultant
   Internet—check if the material will be posted to the public internet
   Other Specify—specify the distribution of the material if it is not defined above D. Type of Material
   Please specify from the list below the type(s) of material to be reviewed: Flipbook, Web Content, RFP/RFI, Newsletter, Sample RFP, Press Release, Fact Sheet, Advertisement, Other-Specify. (See FIG. 5).

E. Marketing Approval
   Is there performance information in the marketing piece?—check yes or no
   What is the source of this information?—choose one or more sources of the included performance data by holding down the CTRL key when making your selection(s).
   Are the source and date named for statistics and performance figures?
   Is the new brand identity definition included?—check yes or no
   Subject to compliance sign-off, have all relevant footnotes and Appendix references been correctly included?—check yes or no
   Do you believe the content to be true, fair and not misleading?—check yes or no
   Is there documentation available to evidence facts and figures used?—check yes or no
   Business/Requestor Signoff (Name/Date/Time)—type in the name and date of approval of an associate of the product or presentation that has reviewed and approved the accuracy of the presentation. This person should be a VP or person specifically designated by Compliance who can attest to the accuracy of the material.

In the example in FIG. 5, the requestor has selected "Flipbook" as the type of the business development material to be reviewed.

Turning to FIG. 6, the review requestor is also required to specify the reviewer(s) for the compliance and/or performance review. To assist the requestor in identifying the right reviewers for the request, a help file is available, along with a list of performance reviewers in provided in a Performance list box 60, and a list of compliance reviewers are provided in a Compliance list box 62, from which the requestor can select the reviewers for the particular request. In one implementation, the requestor is required to select a primary performance reviewer and a secondary performance reviewer based on the selected type of CARF or if it is an alternative product, and to select a primary compliance reviewer and a secondary compliance reviewer based on the regional location of the presentation. The CARF form 56 also includes an Attach Files section that allows the requestor to attach files containing the marketing presentation materials that are to be approved by the reviewers. To attach a file, the requestor specifies the link or URL to the file in the space 64 provided. By click on the Browse button 65, the requestor can browse file directories to locate the file to be attached with the request.

Once the requestor has entered the required information concerning the review request and clicks "Submit" button 66 in the form 56, the information entered into the CARF web page 56 is stored, or archived, in the database 40 so that it can be tracked real-time or used later for auditing and performance review purposes. Each CARF submitted is given a dynamically generated number based on the type of CARF and a numerical sequence. The application server 22 generates a request document 32 (FIG. 1) that is populated using the information entered by the requestor 28 into the CARF web page 56. The application server 22 then automatically sends an email message 31, with the request document 32 and the files containing the marketing materials 36 to be reviewed as attachments, to the selected performance and/or compliance officers. The recipients of the email message depend on the type of CARF, production or region of the presentation as entered by the requestor in the web-based form.

FIG. 7 shows an example of an email message sent to a reviewer. The email message 70 notifies the reviewer that he has been selected by the requestor to review and approve the request. The email message 70 includes the request document 32 as an attachment, and may include other information as shown in the request information table 71 in the email message.

When a reviewer receives an email message with a request document, he opens the attachments in the email to review the marketing materials attached thereto, and sends his comments back to the requestor. Once all comments are incorporated into the materials to be reviewed, the reviewer completes those sections in the request document reserved for the reviewer, and saves the request document. The performance reviewer should forward the completed CARF to the compliance reviewer, and the compliance reviewer will send the completed CARF back to the requestor.

Figure 8:
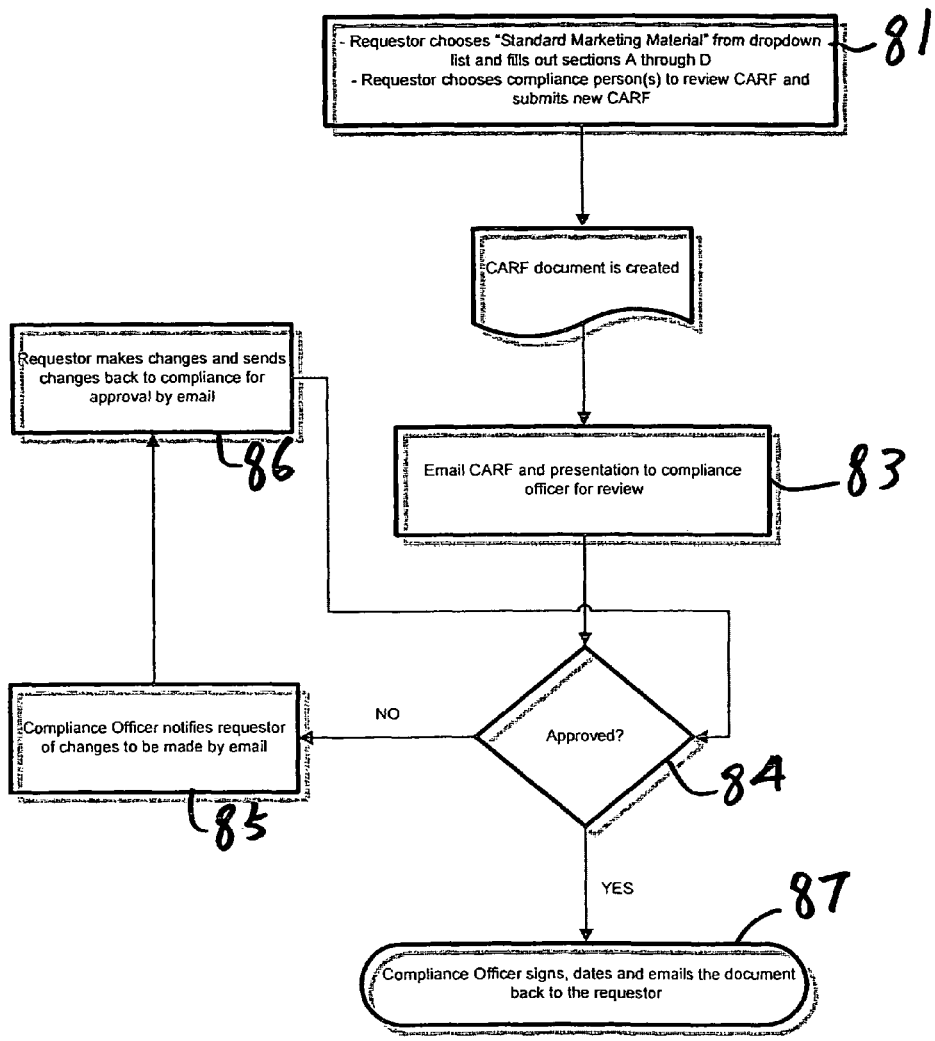
FIG. 8 is a flow chart showing a process for a review request using standard marketing materials.

Based on the type of CARF chosen by the requestor, the system will determine if compliance and/or performance officers will receive an email requesting approval. FIG. 8 shows in a flow chart form the process of reviewing a marketing presentation with standard marketing material. If the requestor selects the Standard Marketing Material request type (step 81), the Performance list box in the web-based CARF page 56 containing the names of performance reviewers is disabled so that the requestor cannot select from it. Performance review in this case is not necessary because the presentation is a standard one that was already globally approved by compliance and performance. When the form is submitted (step 82), the email requesting approval is only sent to the selected compliance officer(s) (step 83). The review process is carried out in an iterative manner, with the reviewer providing comments regarding changes to be made (step 85), and the requestor making the changes and sending the materials with the changes back by email to the reviewer for approval (step 86). Once the materials are approved (step 84), the compliance officer signs, dates, and emails the request document back to the requestor (step 87).

Figure 9:
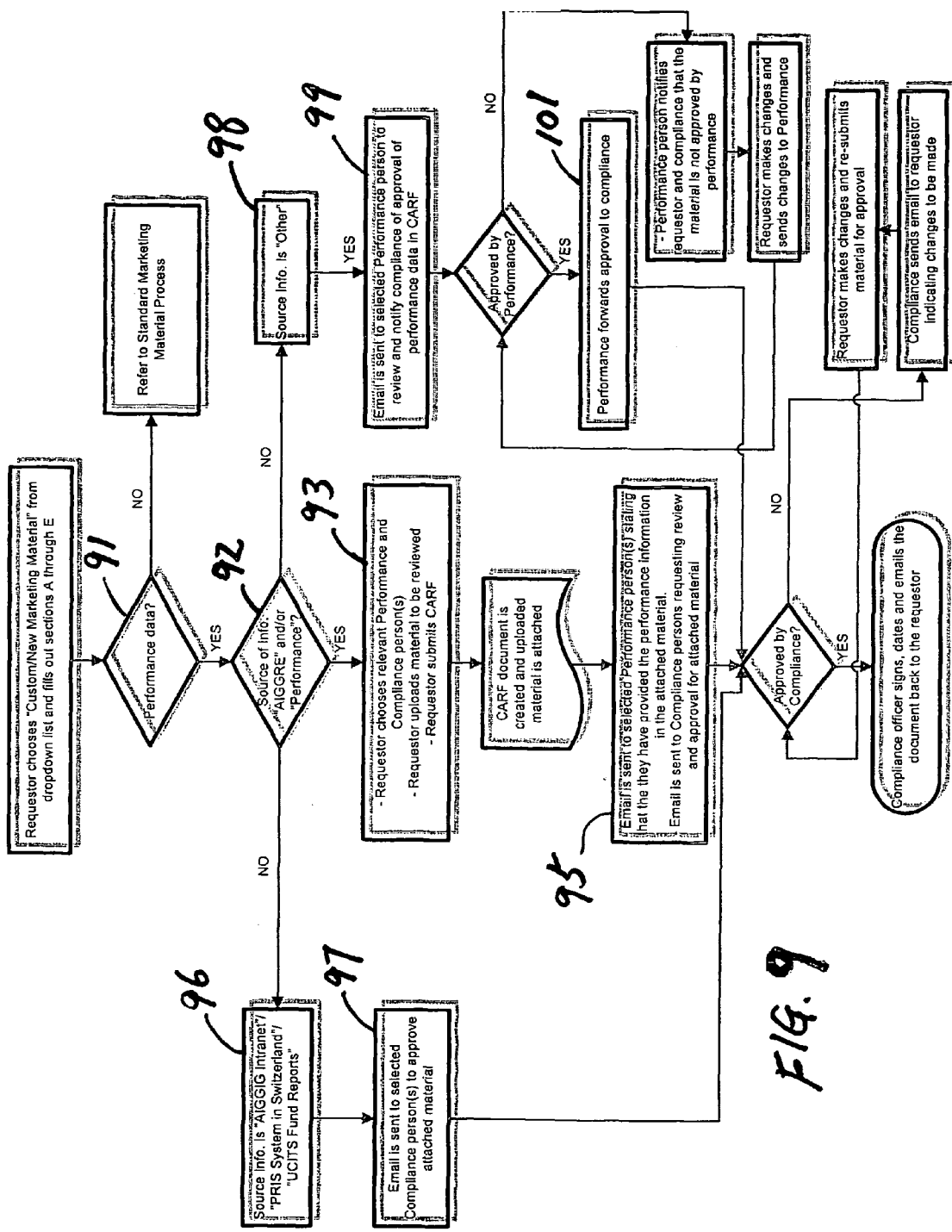
FIG. 9 is a flow chart showing a process for a review request that uses non-standard marketing materials.

In contrast, if the requestor chooses the request type to be Content Changes to Standard Marketing Material, Data Updates to Standard Marketing Material, or Custom/New Marketing Material, the requestor is required to fill out sections A-E in the request form shown in FIGS. 4-6. FIG. 9 shows the process for reviewing a marketing presentation that contains custom/new marketing materials, content changes to standard marketing materials, and data updates to standard marketing materials. Within Section E (FIG. 6) of the form, if the requestor chooses "No" as an answer to the question "Is there performance information in the marketing piece?" (step 91), then the Performance Reviewers list box containing names of performance officers is disabled. The email requesting approval will only be sent to the selected compliance officer.

If, however, the requestor answers "Yes" to that question, then depending on the source of the information one of the following alternatives will occur. If the requestor chooses "AIGGRE" and/or "Performance" (step 92), she is required to choose the performance officer(s) who provided the data from the Performance list box and the Compliance officer from the Compliance list box (step 93). In that case, two emails will be sent (step 95). The selected performance officer will receive a notice email which does not require approval from the performance officer unless the data provided is incorrect. The selected compliance officer will receive a separate email requesting approval.

If the requestor chooses "AIGGRE Intranet," and/or "PRIS System in Switzerland," and/or "UCITS Fund Reports" (step 96), no performance review is required, and the requestor is asked to choose only the compliance officer(s) to review the marketing materials from the Compliance list box. This is because those sources are approved performance sources so no additional performance approval is required. An email is sent to the selected compliance officer to request approval of the marketing materials (step 97). If the requestor chooses "Other" (step 98) she is required to fill out the "Additional Comments by Requestor" textbox (FIG. 6) and select the relevant product specialist in the Performance list that needs to review and approve the data in the marketing materials. The requestor also chooses the compliance officer(s) from the Compliance list box. Two emails are then sent out, one to the selected performance officer for performance approval (step 99), and the other to the selected compliance officer for compliance approval (step 101), contingent upon performance approval.

Figure 10:
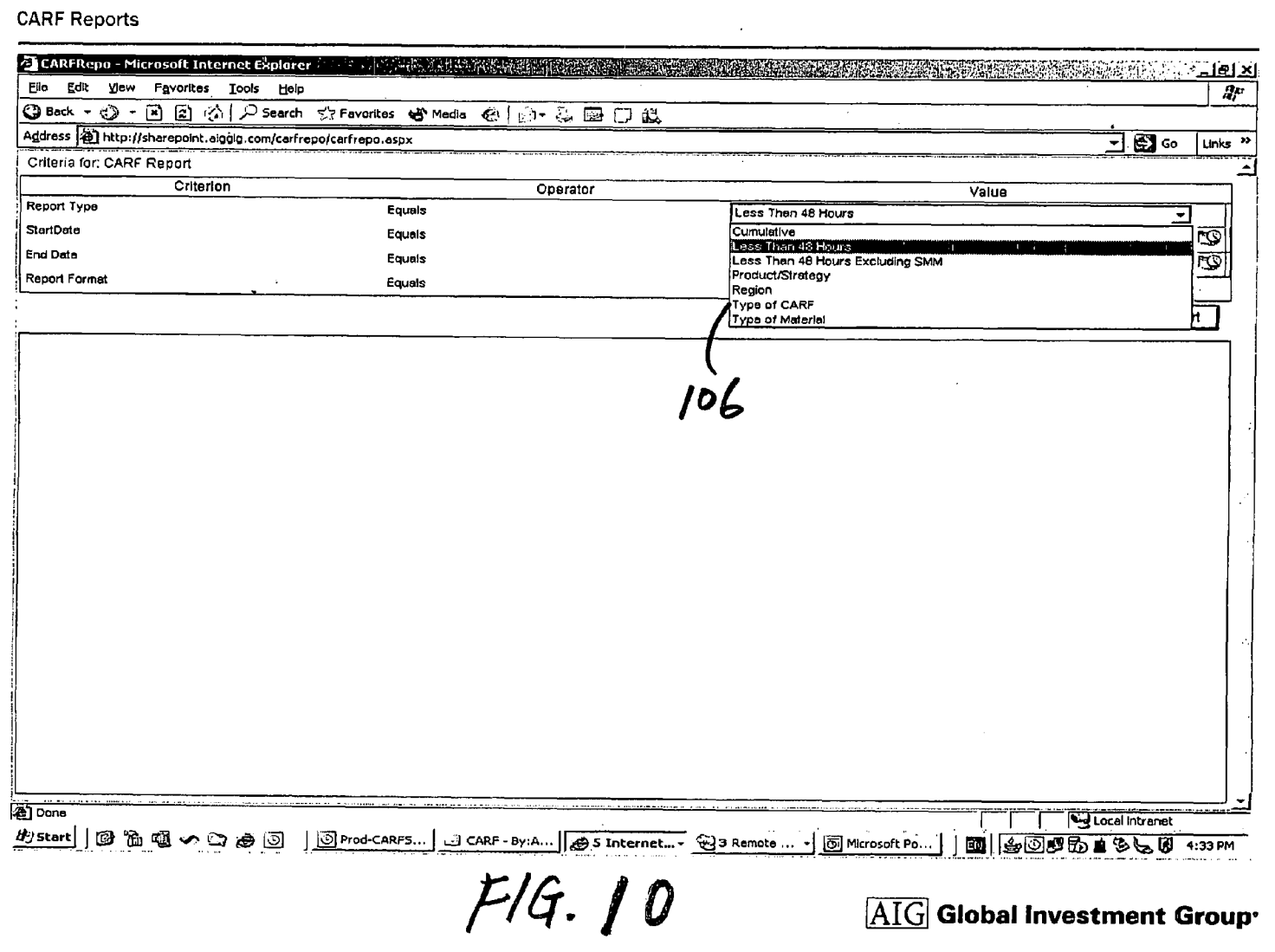

By archiving the review requests and responses, the system can build up a database 40 that can be used for monitoring and auditing purposes. For instance, the data can be used for statistical performance analyses. By way of example, as shown in FIG. 10, the application server may generate reports based on criteria 106 selected by a user. In one implementation, there are seven criteria that can be selected for report generation: Cumulative, Less than 48 hours, Less than 48 hours excluding Standard Marketing Materials, Product/Strategy, Region, Type of CARF, and Type of material.

Figure 11:
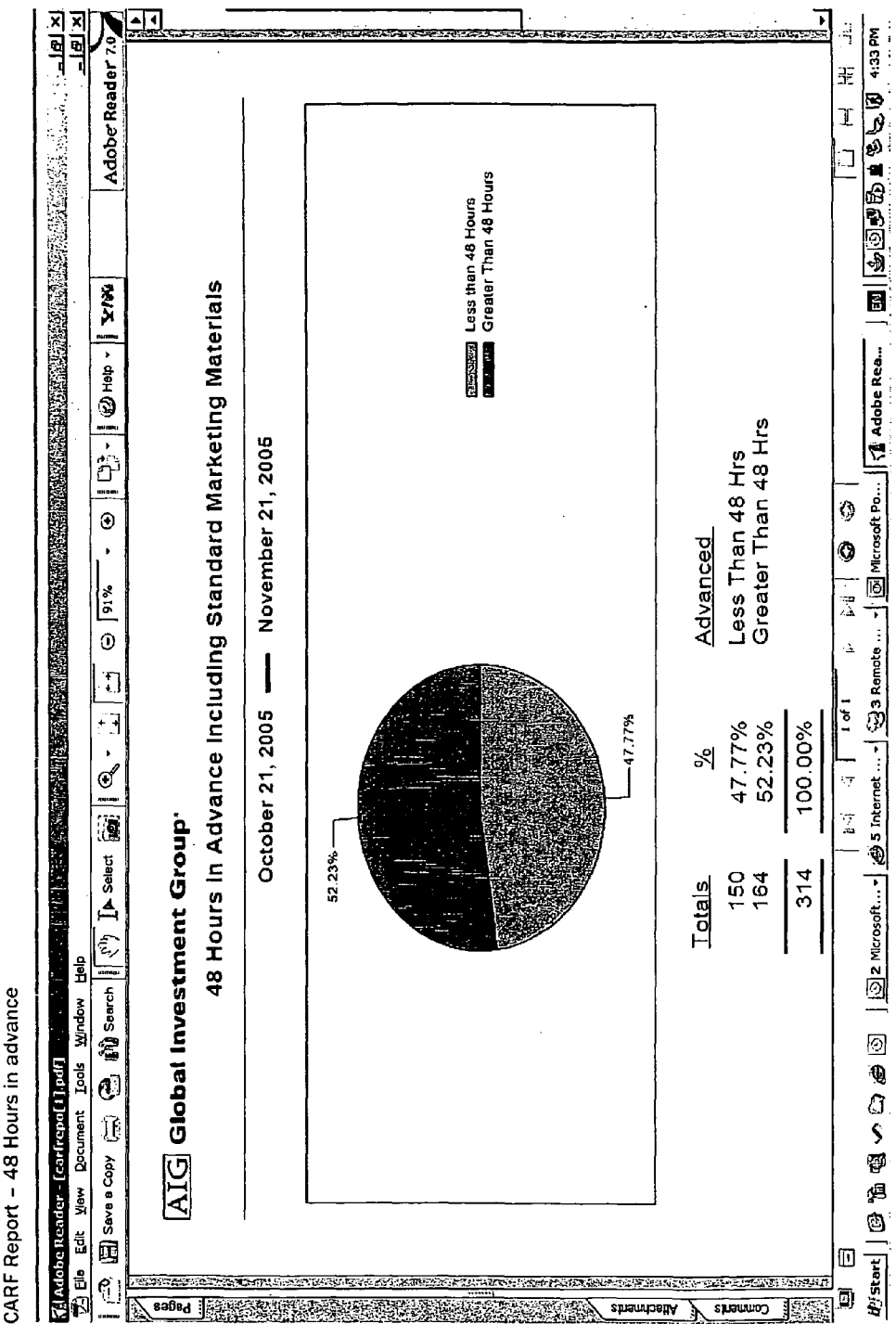
FIG. 11 is a report showing a statistical analysis of review requests based on a given criterion.

The contents and format of the report can be tailored according to the need of the report requestor. FIG. 11 is an exemplary report page showing, in a pie-chart format, the percentage of requests made more than 48 hours in advance of making the marketing presentation. Reports based on various other criteria can also be generated. The collection of data in the database allows the generation of reports easily and readily for performance evaluation and auditing purposes.

In view of the many possible embodiments to which the principles of this invention may be applied, it should be recognized that the embodiment described herein with respect to the drawing Figures is meant to be illustrative only and should not be taken as limiting the scope of invention. Those of skill in the art will recognize that the elements of the illustrated embodiments can be modified in arrangement and detail without departing from the spirit of the invention. Therefore, the invention as described herein contemplates all such embodiments as may come within the scope of the following claims and equivalents thereof.

The invention claimed is:

1. A system for automated processing of requests for approval of marketing materials for at least one of a product and a service, comprising:

an application server located on a network and programmed to present through an electronic user interface a review request form with data fields adapted to collect data from a requestor connected to the network, the data fields including:

at least one data field adapted to indicate the marketing materials under review include performance information relating to the performance of the product or service, at least one data field adapted to indicate a selection of at least one performance reviewer for reviewing performance information in the marketing materials, at least one data field adapted to indicate a selection of at least one compliance reviewer for reviewing the marketing materials for compliance with at least one predetermined criteria, and at least one data field adapted to indicate a review request type from a set of predetermined review request types, the application server being further programmed to selectively enable at least one of a list of performance reviewers and a list of compliance reviewers in the request form for selection therefrom by the requestor based on the review request type selected by the requestor, to generate a review request document based on information entered by the requestor, and to send an electronic message including the request document to at least one selected reviewer; and a database for archiving information regarding the review request document and the marketing materials.

2. The system according to claim 1, wherein the electronic message is an email message.

3. The system according to claim 2, wherein the review request form includes a section adapted to attach the marketing materials to be reviewed to the review request form, and wherein the application server generates the email message with the marketing materials attached thereto.

4. The system according to claim 1, wherein the application server is further programmed to generate a report based on information regarding review request documents archived in the database.

5. The system according to claim 1, wherein the application server is programmed to present a user interface screen that includes a report generation section adapted to generate a report based upon a selection of report generation criteria by a requestor, and the report is generated based on information regarding review request documents archived in the database in response to the report generation criteria received through the user interface screen.

6. The system according to claim 1, wherein the application server is programmed to selectively disable at least one data field based on the review request type selected by the requestor.

7. A method of processing requests for approval of marketing materials for at least one of a product and a service, the method comprising:
presenting a review request form through an electronic user interface over a network to a requestor connected to the network, the review request form having a plurality of data fields including:
at least one data field adapted to indicate the marketing materials under review include performance information relating to the product or service,
at least one data field adapted to indicate a selection of at least one performance reviewer for reviewing performance information in the marketing materials, and
at least one data field adapted to indicate a selection of at least one compliance reviewer for reviewing the marketing materials for compliance with at least one predetermined criteria;
receiving information from the requestor through the review request form, including receiving a selection of a review request type from a set of predetermined review request types;
selectively enabling at least one of a list of performance reviewers and a list of compliance reviewers in the request form for selection therefrom by the requestor based on the review request type received from the requestor;
generating a review request document based on information received from the requestor; and
sending an electronic message with the request document to at least one selected reviewer.

8. The method according to claim 7, wherein the step of receiving information from the requestor includes receiving a selection of a performance reviewer, and the method further comprising:
determining, by the selected performance reviewer, if the performance information is approved for inclusion in the marketing materials.

9. The method according to claim 8, the step of receiving information from the requestor includes receiving a selection of a compliance reviewer, and the method further comprising:
determining, by the compliance reviewer, if the marketing materials are in compliance with at least one predetermined criteria.

10. The method according to claim 7, the step of receiving information from the requestor includes receiving a selection of a compliance reviewer, and the method further comprising:
determining, by the compliance reviewer, if the marketing materials are in compliance with at least one predetermined criteria.

11. The method according to claim 7, wherein the step of presenting the request form includes selectively enabling a section in the request form based on information received from the requestor.

12. The method according to claim 7, wherein the step of presenting the request form includes selectively disabling a section in the request form based on information received from the requestor.

13. The method according to claim 7, further comprising:
archiving, in a database, information regarding the review request document and the marketing materials.

14. The method according to claim 13, further comprising:
presenting a user interface screen that includes a report generation section adapted to generate a report based upon a selection of report generation criteria;
receiving report generation criteria through the user interface screen;
generating a report using information archived in the database based on the received report generation criteria.

15. The method according to claim 7, wherein the electronic message is an email message.

16. The method according to claim 15, wherein the email message includes the marketing materials attached thereto.

* * * * *